United States Patent [19]
Abreu-Marston

[11] Patent Number: 5,938,089
[45] Date of Patent: Aug. 17, 1999

[54] LIQUID CONTAINER FOR USE WHILE EXERCISING

[76] Inventor: Nilsa Abreu-Marston, P.O. Box 294, Crestone, Colo. 81131

[21] Appl. No.: 08/957,988

[22] Filed: Oct. 3, 1997

[51] Int. Cl.⁶ .................................................. A45F 5/00
[52] U.S. Cl. ......................... 224/148.5; 224/148.7; 224/222; 224/245; 224/267; 215/382; 215/900
[58] Field of Search ............................ 224/148.1–148.7, 224/222, 267, 245, 901.4; 215/382, 900; 222/175; 482/74, 105

[56] References Cited

U.S. PATENT DOCUMENTS

| | | | |
|---|---|---|---|
| 1,304,114 | 5/1919 | Staples | 224/148.5 |
| 4,090,650 | 5/1978 | Gotta | 224/148.6 |
| 4,974,762 | 12/1990 | Boretsky et al. | 224/148.5 |
| 5,120,288 | 6/1992 | Sinaki | 224/901.4 |
| 5,201,438 | 4/1993 | Norwood | 215/900 |
| 5,395,023 | 3/1995 | Naymark et al. | 224/245 |
| 5,398,848 | 3/1995 | Padamsee | 222/175 |
| 5,562,221 | 10/1996 | Beniacar | 215/382 |
| 5,566,869 | 10/1996 | Katz | 224/148.5 |
| 5,584,413 | 12/1996 | Jung | 215/382 |
| 5,669,529 | 9/1997 | Levit | 482/74 |

FOREIGN PATENT DOCUMENTS

| | | | |
|---|---|---|---|
| 1413545 | 8/1965 | France | 215/382 |
| 1432186 | 4/1996 | Germany | 215/382 |
| 571979 | 1/1976 | Switzerland | 215/900 |

*Primary Examiner*—Gregory M. Vidovich
*Attorney, Agent, or Firm*—Malin, Haley, DiMaggio & Crosby, PA

[57] ABSTRACT

A portable liquid container for use while exercising to provide a source of fluid and to enhance the benefits of exercise by increasing the load on selected limbs and muscles. The container comprises a contoured liquid container body and strap assembly for removably securing a container to a user such that one or more containers may be carried by the user while exercising to provide additional weight to enhance the benefits of exercising. The container body includes a flexible concave wall for comfortably conforming to the user's body. The strap assembly includes at least one spare pocket for containing personal articles.

3 Claims, 3 Drawing Sheets

LIQUID CONTAINER FOR USE WHILE EXERCISING

BACKGROUND OF THE INVENTION

1. Field of the Invention

The present invention relates to portable liquid containers, and more particularly to a portable liquid container and strap assembly which can be securely attached to a person while exercising to provide a source of weight, while providing a portable source of liquid to replenish bodily fluids.

2. Description of the Background Art

The benefits of physical fitness have been widely recognized in recent times. Accordingly, more and more people are engaging in various forms of physical exercise. Exercising causes the body to lose fluids through perspiration and exhalation. Therefore, when exercising, it is very important to avoid dehydration by consuming fluids such as water. Water is considered the most critical nutrient in a person's body and must be continuously replenished. Water lubricates joints, regulates temperatures and provides the body with minerals and essential fluids. It has been found that a person can lose 1 to 2 quarts of water per hour while running, biking or engaging in other physical activity. It is difficult, however, for a person to carry water for consumption while exercising since water is relatively heavy.

Furthermore, it is recognized that the beneficial effects of exercise may be enhanced by the use of weights. Specifically, attaching weights to one's legs while running or walking helps in building leg muscles and increases cardiovascular performance. In addition, attaching weights to one's arms while exercising helps in building arm muscles and also increases cardiovascular performance.

Accordingly, there exists a need for an apparatus including a portable water container which can be conveniently and comfortably secured to a user's arm or leg to provide a source of drinking water and to increase the benefits of exercising by functioning as a weight.

SUMMARY OF THE INVENTION

An apparatus for use while exercising to provide additional weight to a body limb while providing an accessible supply of a replenishing liquid to the exerciser. The apparatus includes a liquid container made of a light weight plastic body strategically shaped and contoured so as to conform to a body limb so as not to interfere with body motions, and a body attachable harness for removably attaching the container to a body limb. For example, the user may fill a pair of flasks with any suitable liquid such as water and attach a flask to each leg thereby increasing the load on the leg muscles during walking, running or biking. Likewise, the user may affix water filled flasks to other parts of the body, such as the arms, to achieve a similar effect. As is apparent, each flask provides a source of drinking water for replenishing bodily fluids and provides weight for increasing the resistance on the wearer's limbs.

The contoured container body comprises a container having an opening sealable by a cap. The container body includes a curved shape and defines a concavely shaped arcuate surface for conforming engagement with a wearer's arm, leg, or waist. The container body is fabricated from a suitable lightweight material, such as plastic, and includes opposing sides with corrugated portions for allowing the container body to flex in response to the expansion and contraction of the user's muscles, such that the container body is comfortably worn and does not unduly restrict muscular movement.

A harness or strap assembly provides a means for removably securing the container body to the user's body. The strap assembly includes a container body receiving pocket, for removably securing the container body therein, and a pair of connectable end portions for securing the strap assembly to a user. The strap assembly end portions may be elastic and may be detachably connected to one another by hook and loop fastening material for securing the strap assembly and container body to a particular part of the user's body, such as the leg, waist, or arm. The container receiving pocket is further designed to maintain the container body securely therein and prevent the container body from being dislodged during exercise. In addition, the strap assembly includes at least one closable spare pocket wherein the user may store personal items, such as keys, money, etc.

Accordingly, it is an object of the present invention to provide a portable water container comfortably attachable to a person while exercising that does not interfere with the exercise.

An additional object of the present invention is to provide a portable water container that functions as an exercise weight, comprising a flask-shaped container body having an concavely shaped arcuate surface, which is shaped to generally conform to contours of the human body for comfort and does not interfere with the exercise routines.

Yet another object of the present invention is to provide a contoured flask which incorporates corrugated portions to allow the flask body to flex.

Still another object of the present invention is to provide a strap assembly having a pocket for containing a contoured flask, for removably securing the flask to a user's body.

In accordance with these and other objects which will become apparent hereinafter, the instant invention will now be described with particular reference to the accompanying drawings.

DESCRIPTION OF THE PREFERRED EMBODIMENTS

Figure 1:
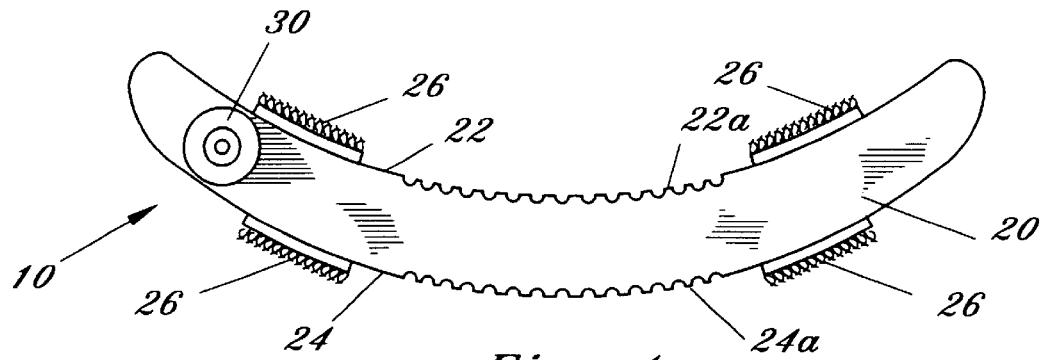
FIG. 1 is a top plan view of a container according to the present invention.
Figure 2:
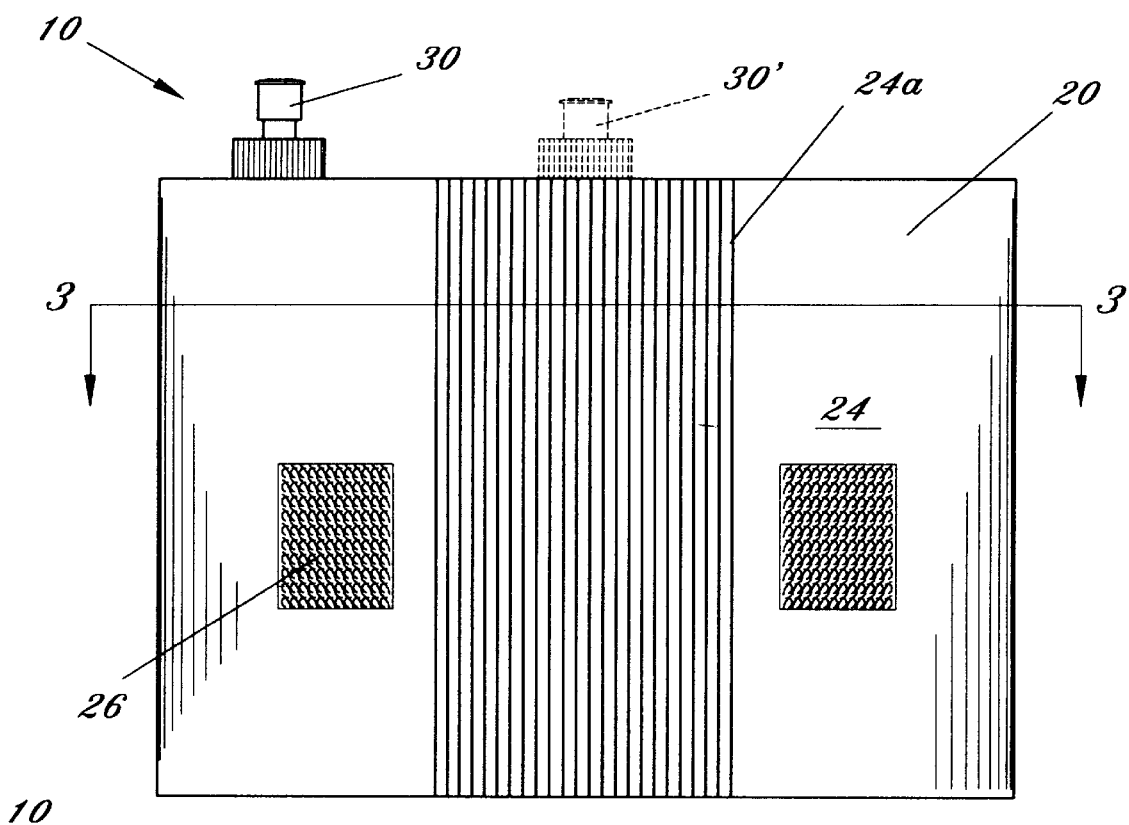
FIG. 2 is a front elevational view of the container depicted in FIG. 1.
Figure 3:
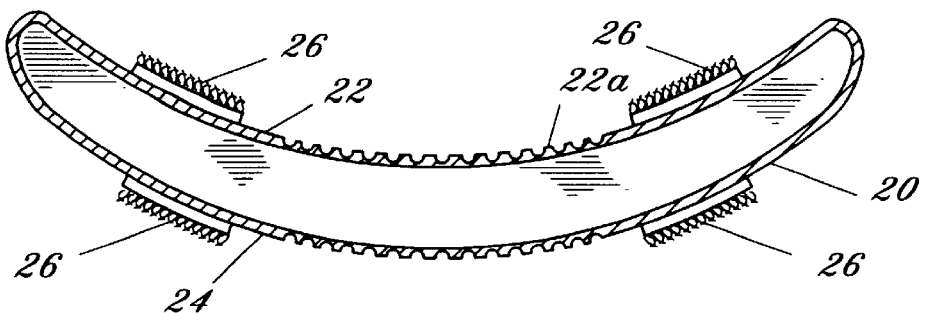
FIG. 3 is a sectional view of the container depicted in FIG. 2, along section line 3—3.

With reference to the drawings, FIGS. 1–3 disclose a preferred embodiment of the portable liquid container of present invention generally referenced as 10. The liquid container comprises a container, which includes a container body 20 defining an internal liquid reservoir, and a cap 30. Container body 20 defines opposing arcuate side walls, 22 and 24 respectively. Side wall 22 defines a generally concave outer surface, and side wall 24 defines a generally convex outer surface. As best depicted in FIG. 1, each side wall, 22 and 24, includes a corrugated mid-section, generally referenced as 22a and 24a respectively, for allowing each side wall to flex. Container 10 further includes a quantity of hook and loop fastening material 26, adhesively secured to one or more external surface areas, such as side walls 22 and 24, for reasons which will soon become apparent. In the preferred embodiment, cap 30 comprises a push/pull cap whereby the cap is opened by pulling the cap to an extended position wherein fluid is allowed to flow from the reservoir, and closed by pushing the cap to a retracted sealed position. Cap 30 is preferably positioned offset from center as depicted in FIGS. 1 and 2, but any suitable position, such as the position depicted as 30' is considered within the scope of the invention.

Container 10 may be fabricated from any, lightweight, corrosion resistant material, such as polyethylene; however, any suitable material is considered within the scope of the present invention. The container may be of any suitable size, however, the reservoir is preferably sized for containing between 8 and 16 fluid ounces of liquid. Container 10 preferably defines a thin profile to minimize wind resistance and avoid interfering with the user's motion.

Figure 4:
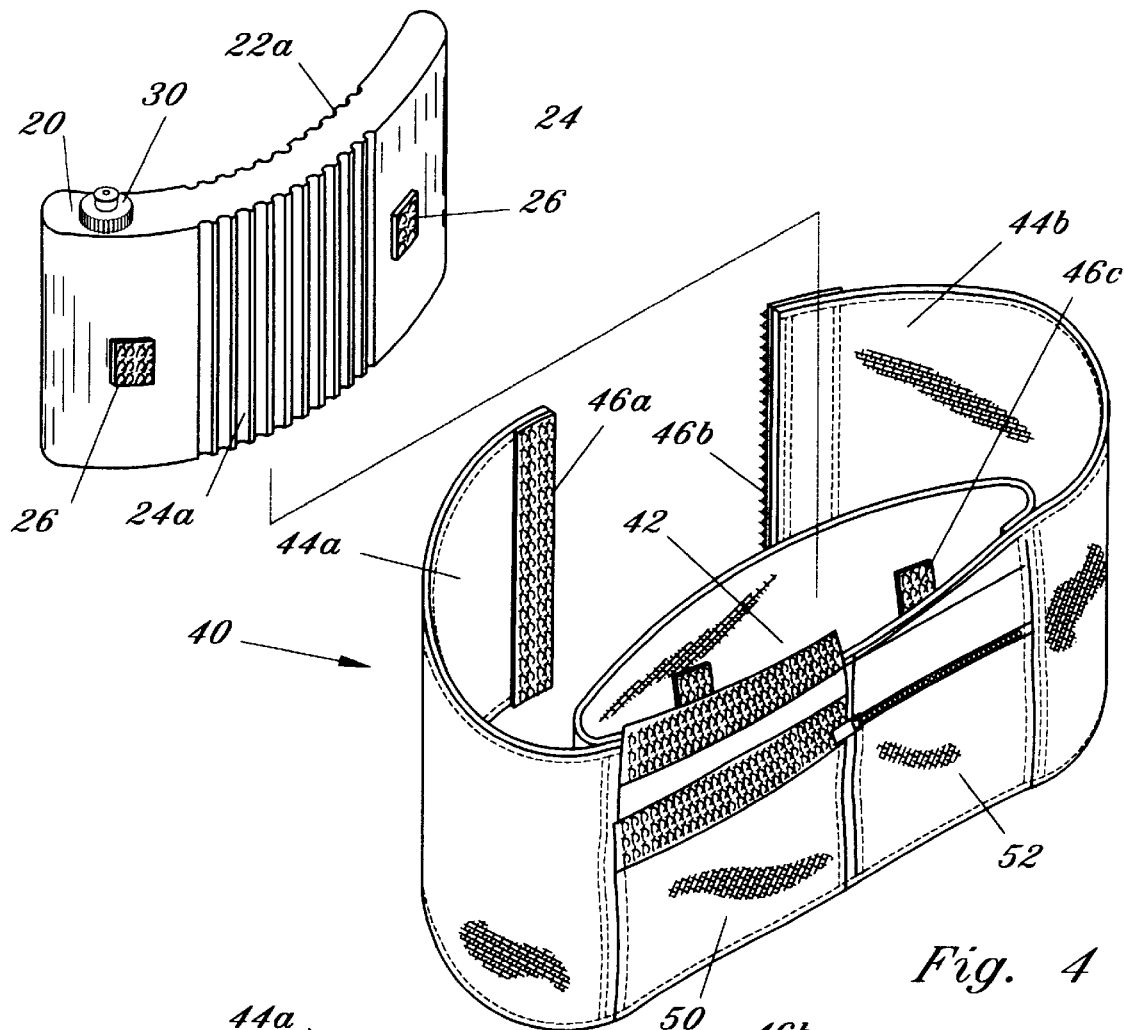
FIG. 4 is an exploded view of the container and strap assembly.
Figure 5:
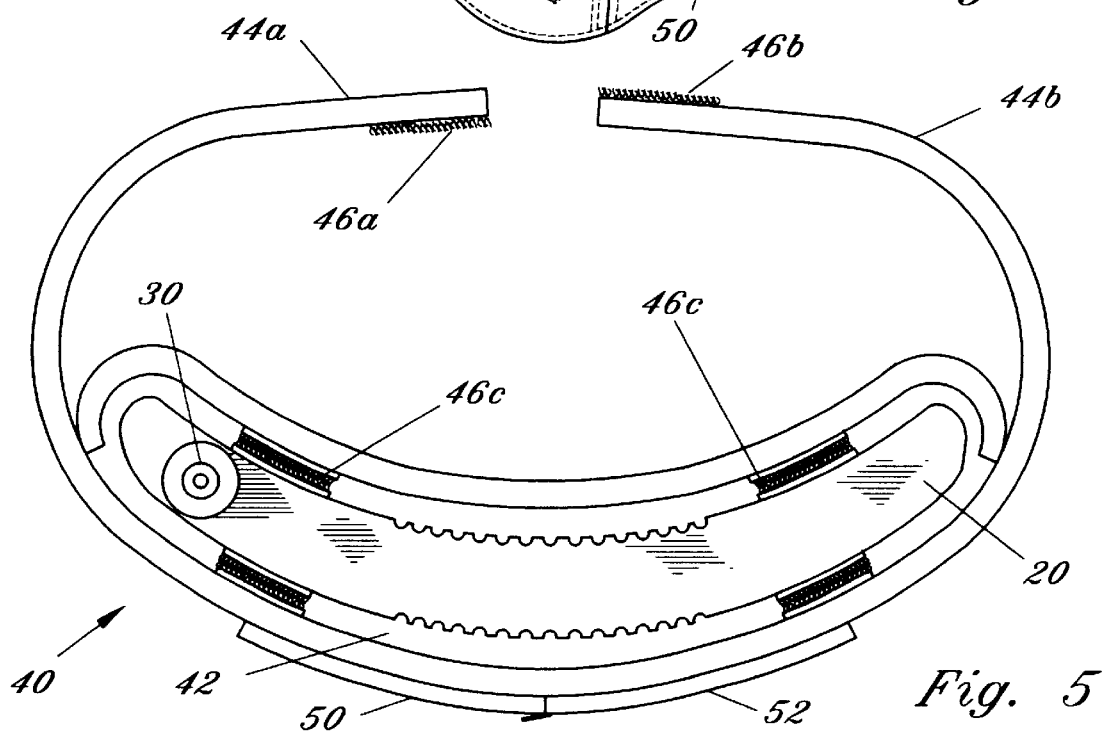
FIG. 5 is a top plan view of the container mounted within the strap assembly.

As best depicted in FIGS. 4 and 5, strap assembly 40 includes a fabric enclosure shaped to snugly receive the container body such as a structural portion thereof defining a container body receiving pocket 42, and further includes a pair of selectively connectable and detachable end portions 44a and 44b. In the preferred embodiment, connection of end portions 44a and 44b is facilitated by hook and loop fastening material, referenced as 46a and 46b, attached to end portions 44a and 44b, any suitable connecting hardware, however, is considered within the scope of the invention. Pocket 42, of strap assembly 40, further includes a quantity of hook and loop fastening material 46c secured therein for mating engagement with hook and loop fastening material 26 on container 10, for removably anchoring container 10 within pocket 42. A sufficient quantity of hook and loop material is contemplated such that container 10 is prevented from being dislodged from pocket 42 while the user is exercising, however, the user may remove container 10 by grasping the container and exerting sufficient force. Strap assembly 40 may further include one or more additional pockets, referenced as 50 and 52, which are preferably closeable for containing personal items such as keys, money, etc.

Figure 6:
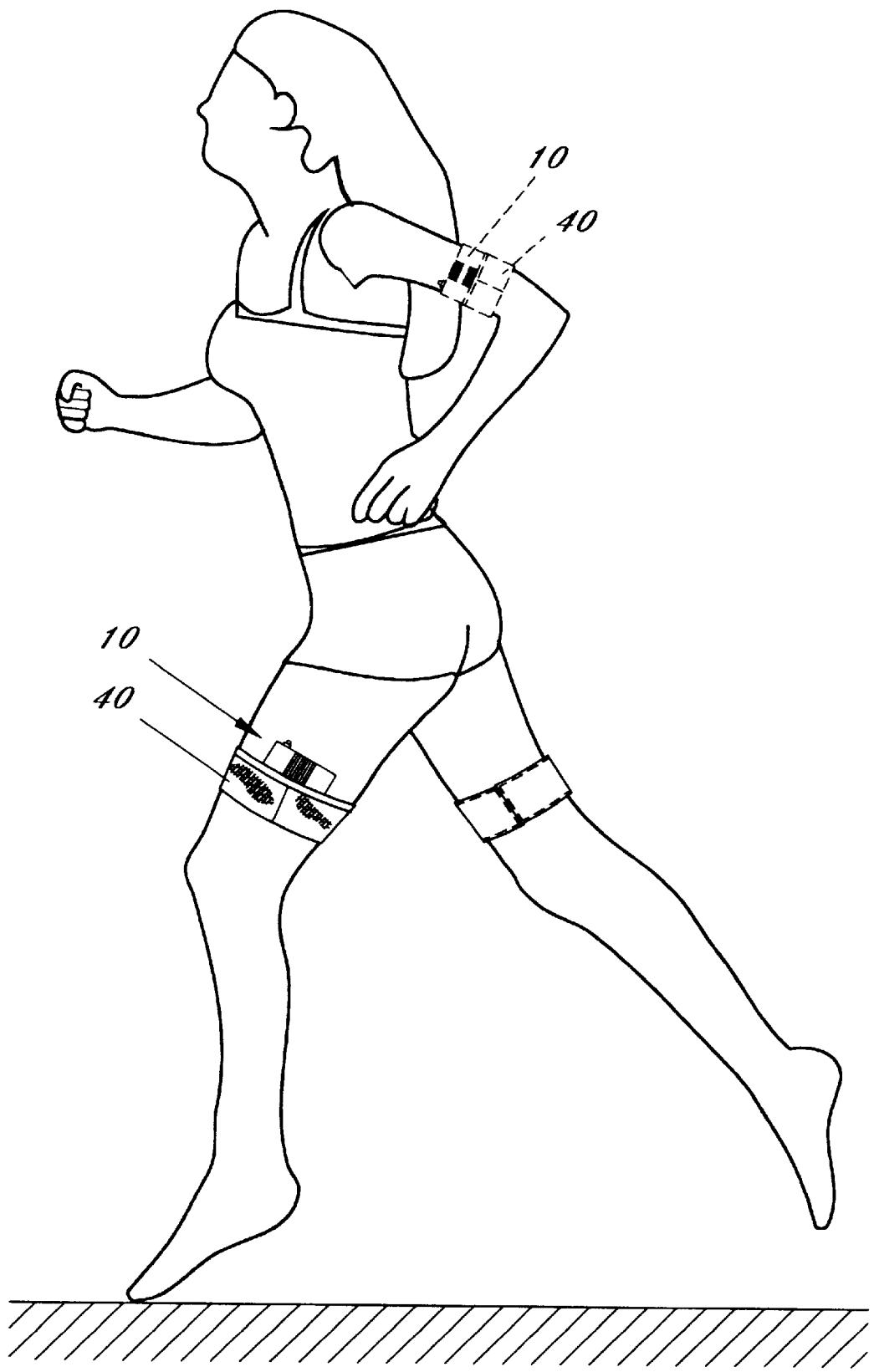
FIG. 6 illustrates the present invention worn by a user while exercising.

As best depicted in FIG. 6, container 10 may be filled with a suitable fluid such as water, and inserted within strap assembly pocket 42. Strap assembly 40 may then be secured about the user's leg, arm, or waist by wrapping end portions 44a and 44b therearound and securing the assembly by the engagement of hook and loop material 46a and 46b. When secured to the user's leg, the liquid filled container provides additional weight which increases the load on the leg muscles during walking, running or biking. Likewise, the user may affix water filled containers to other parts of the body, such as the arms, to achieve a similar effect.

As previously disclosed, container 10 defines a thin profile and curved shape having an arcuate surface 22 for conforming engagement with a wearer's arm, leg, or waist, resulting in a comfortable attachment to the wearer. Furthermore, corrugated mid-sections, 22a and 24a, allow the container body to flex in response to the expansion and contraction of the user's muscles such that the container does not unduly restrict muscular movement.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A portable liquid container and strap assembly for mounting said liquid container to the limb of a human being comprising:

a liquid container;

a cap removably attached to said liquid container;

said liquid container having a liquid container body being sized to be carried and mounted on the limb of a human being, said liquid container including a plastic container body having a pair of opposing sidewalls, one sidewall being convex in shape and the opposing sidewall being concave in shape, said container body having curved end walls joining together said opposing sidewalls, said container body having a flat top wall and a flat bottom wall, said convex wall and said concave wall each having a corrugated mid-section running from top to bottom on each sidewall to permit said convex sidewall and said concave sidewall to flex allowing said container body to flex when mounted on a limb during exercise;

a limb engaging fabric strap for attachment to a human limb, said fabric strap having a first free end and a second free end, said first free end having one of a hook and loop material fastener disposed on an outside surface of said fabric strap and said second free end having the other of the hook and and loop material fastener disposed on an inside surface of said fabric strap for engagement with said first free end material fastener for attaching said fabric strap about and to a human limb, said inside surface engageable with human limb when attached thereto;

a container body pocket for receiving said liquid container body attached to the inside surface of said fabric strap to hold said container body therein when said fabric strap is engaged with a human limb, said container body pocket sized to allow manual withdrawal of said container body while said fabric strap is attached to a limb, said container body pocket being made of fabric and having a pocket opening shaped to receive said container body; and said container body pocket including opposing inner wall surfaces, each having at least one small piece of hook and loop material fastener attached thereto, said container body having cooperating hook and loop material fastener pieces respectively attached to said container convex sidewall and said concave sidewall for cooperative engagement with said hook and loop fastener pieces of said inner wall surfaces of said container body pocket for holding said container body in said container body pocket during exercise.

2. A portable liquid container and strap assembly as in claim 1, including: said cap including a push-pull opening enclosure for dispensing liquid from said liquid container.

3. A liquid container and strap assembly as in claim 1, including: a second fabric pocket attached to the outside surface of said fabric strap, said second fabric pocket being sized to receive a key or money.

* * * * *